United States Patent [19]

Mitsutsuka

[11] Patent Number: 5,038,363

[45] Date of Patent: Aug. 6, 1991

[54] CORRELATION PROCESSING DEVICE USING A SURFACE ACOUSTIC WAVE CONVOLVER

[75] Inventor: Syuichi Mitsutsuka, Tokyo, Japan

[73] Assignee: Clarion Co., Ltd., Tokyo, Japan

[21] Appl. No.: 521,143

[22] Filed: May 8, 1990

[30] Foreign Application Priority Data

May 18, 1989 [JP] Japan .................................. 1-125987

[51] Int. Cl.$^5$ .............................................. H04B 3/00
[52] U.S. Cl. ........................................... 375/1; 380/34
[58] Field of Search .............................. 375/1; 380/34

[56] References Cited

U.S. PATENT DOCUMENTS 4,691,326  9/1987  Tsuchiya .................................. 375/1
4,745,378  5/1988  Niitsuma et al. ..................... 333/196

Primary Examiner—Thomas H. Tarcza
Assistant Examiner—David Cain
Attorney, Agent, or Firm—Flynn, Thiel, Boutell & Tanis

[57] ABSTRACT

A correlation processing device using a surface acoustic wave convolver, is disclosed, in which there are disposed gate sections in the in- and output stages of the convolver and these gates are controlled synchronously to reduce the self convolution in the convolver.

14 Claims, 8 Drawing Sheets

CORRELATION PROCESSING DEVICE USING A SURFACE ACOUSTIC WAVE CONVOLVER

FIELD OF THE INVENTION

The present invention relates to a correlation processing device using a surface acoustic wave (hereinbelow abbreviated to SAW) convolver used in the spread spectrum (hereinbelow abbreviated to SS) communication.

BACKGROUND OF THE INVENTION

The SAW convolver is widely utilized as a central element in the receiving section of an SS communication apparatus. FIGS. 7A and 7B show block diagrams indicating the fundamental operation (by a prior art method) of the SS communication apparatus.

FIG. 7A represents a transmitter, in which reference numeral 1 is a data signal; 2 is a PN code generator; 3 is a mixer; 4 is a carrier signal; 5 is an amplifier; and 13 is 6 is a transmitting antenna. FIG. 7B represents a receiver, in which 7 is a receiving antenna; 8 is a local oscillator; 9 is an oscillator; 10 is an SAW convolver; 11 is a low pass filter; 12 is a high pass filter; and a data demodulator.

By the prior art method indicated in FIGS. 7A and 7B, data which are to be transmitted are mixed with a PN code to be transmitted. Since the frequency band of the PN code is wider than the frequency band of the data signal, the spectrum of the transmitted signal E(t) is spread over a frequency band wider than the spectrum of the original data signal D(t). On the other hand, the receiving section indicated in FIG. 7B is so constructed that the received signal S(t) and an internal reference signal R(t) are subjected to a convolution integration by means of the SAW convolver 10. The signal S(t) is a signal obtained by converting the frequency of the received signal by means of the local oscillator 8 and the mixer 3 so that the frequency of the received signal is contained in the working frequency band (inputted frequency band) of the SAW convolver. On the other hand, the reference signal R(t) is a signal obtained by spreading the sinusoidal wave having a frequency $f_r$ determined similarly within the inputted frequency band of the SAW convolver. $f_c$ representing the carrier frequency of the transmitted signal, the frequency $f_L$ of the local oscillator 8 is set usually so that $f_L = f_c - f_r$. Further the PN code within the receiver is set so as to be a code, which is the mirror image (code $\bar{B}$) of a certain PN code (code B). In the case where the codes are set in such a way, a code A representing the PN code of the transmitter, the magnitude of the output of the SAW convolver 10 in the receiver $|C(t)|$ is proportional to the magnitude of the correlation signal of the code A and the code B. That is, the SAW convolver 10 is used as an element executing the correlation operation between the PN codes set by the transmitter and the receiver. If the PN codes set by the transmitter and the receiver are identical to each other ($\bar{B} = A$), a strong correlation output appears in the output of the SAW convolver and thus the communication between the transmitter and the receiver is possible. In the case where the PN codes are different from each other or a signal of the prior art narrow frequency band communication is inputted, only a small correlation output appears in the SAW convolver and thus the communication is impossible.

Consequently it is possible to select a communication party by selecting a PN code and in addition to realize a communication having an extremely small mutual interference with the prior art narrow frequency band communication. In the case where the PN codes are in accordance with each other and thus the communication is possible, information of the data signal 1 appears in the form of variations in the phase or the amplitude of the convolver output C(t). The data demodulator 13 is a section, in which the transmitted data are restored, starting from the phase or the amplitude of the convolver output C(t). The concrete construction of the data demodulator 13 differs, depending on the type of modulation (FSK, DPSK, etc.) of the data signal and further it differs also, depending on what kind of convolver is used, a usual one-track convolver, a 2-gate SAW convolver, or a 2-track SAW convolver. However, as described later, the object of the present invention is to improve the correlation processing method by an SAW convolver and it doesn't relate to the data demodulation method. Further FIGS. 7A and 7B indicate the basic operation of an SS communication apparatus using an prior art SAW convolyer in a simple manner, in which an AGC, a code synchronizing section, etc. are not indicated. The content of the prior art method is described more in detail in the following literatures.

Literature [1]:

Tsubouchi, et al.; "Asynchronous type SSC transceiver using an SAW convolver" Spread Spectrum Communication Study Group of Electronic Information Communication Society of Japan; Technical Report of Electronic Information Communication Society, Vol. 2, No. 1, SS 88-7, April, 1988, pp 40~47.

Literature [2]:

Hamatsu, et al.; "Packet type spread spectrum wireless MODEM using an SAW convolver"; Spread Spectrum Communication Study Group of Electronic Information Communication Society of Japan; Technical Report of Electronic Information Communication Society, Vol. 2, No. 1, SS 88-8, April, 1988, pp 48~53.

Literature [3]:

Mori, et al.; "Code synchronization holding method in a spread spectrum receiver using an SAW convolver"; Report Collection of Electronic Communication Society of Japan, Vol. J69-B, No. 4, 1986, pp 404~405.

An SS communication apparatus using an SAW convolver as described above has various advantages with respect to other SS communication apparatuses. For example, with respect to the SS communication method using a sliding correlator, it has an advantage that the initial synchronization catching time is extremely short. Further, with respect to the SS communication method using a matched filter, it has an advantage that the PN codes can be switched in real time.

However the SS communication apparatus using an SAW convolver by the prior art method has various problems caused by the fact that the SAW convolver is no ideal convolution integrator. A problem, which is particularly serious among them, is an influence of the self convolution signal produced in the SAW convolver. FIG. 8 is a top view of the SAW convolver for explaining the self convolution in a simple manner, in which reference numeral 14 is a piezo-electric substrate; 15 is an interdigital electrode; 16 is a gate electrode; 17 is an input terminal; and 18 an output terminal.

In FIG. 8, when electric signals S(t) and R(t) are applied to the two input terminals 17, they are converted into SAWs at the respective interdigital electrodes 15. At this time, if only surface waves $\phi_g$ and $\phi_r$, which propagate in two directions opposite to each other, existed on the gate electrode, the signal appearing on the output terminal would represent an ideal convolution integral (excepting that the integration time is finite). However, in reality, the surface waves $\phi_g$ and $\phi_r$ are reflected by the interdigital electrodes 15, which are opposite to each other, which gives rise to reflected waves $\phi_g'$ and $\phi_r'$. In such a case the output signal can be expressed by the following formula;

$$C(t) = K \int_{t-T}^{t} S(\tau) R(2t - T - \tau) d\tau + \tag{1}$$

$$K \Gamma \exp(-\alpha L) \int_{t-T}^{t} S(\tau) R(2t - T - \tau) d\tau +$$

$$K \Gamma \exp(-\alpha L) \int_{t-T}^{t} R(\tau) S(2t - 2T - \tau) d\tau$$

$$T = \frac{L}{v}, \tag{2}$$

where L represents the gate length; v denotes the propagation speed of the SAW; K is a constant; $\Gamma$ is a reflection coefficient of the SAW by the interdigital electrodes; and $\alpha$ is a attenuation constant of the SAW, and further T corresponds to the in-gate delay time.

The first term of Eq. (1) represents the convolution integration signal of S(t) and R(t) and as indicated by Eq. (1), also signals expressed by the second and third terms, other than the first term, take place. The second and third terms are terms, which would not exist, if there were no reflected wave ($\Gamma=0$), and represent a self convolution signal. It will be clear that, when there exist such influences of the self convolution signal, the correlation output C(t) in the receiver indicated in FIG. 7B is influenced thereby. One of these influences is that the spurious level of the correlation output becomes higher than the ideal value and that as the result the rate of errors at the restoration of the data increases. Another of the influences is that, in the case where a strong narrow frequency band signal is mixed in the input signal S(t) through the receiving antenna 7, the spurious level of the correlation output is raised similarly and that the rate of errors at the restoration of the data increases remarkably. FIGS. 9A to 9E show this aspect.

FIG. 9A indicates the input signal, in the case where there are no disturbing signals N(t); FIG. 9B the reference signal; FIG. 9C a narrow frequency band disturbing signal; FIG. 9D the correlation output, in the case where there are no disturbing signals N(t); and FIG. 9E the correlation output, in the case where disturbing signals N(t) are mixed.

FIGS. 9A to 9E show an example indicating how the correlation output C(t) varies, in the case where a strong narrow frequency band signal N(t) is mixed in the input signal S(t). Further FIGS. 9A to 9E show an example, in the case where the period of the PN code is equal to the in-gate delay time T.

In the case where a narrow frequency band disturbing signal N(t) having a frequency $f_1$ is mixed in the input signal, a self convolution output of N(t) having a frequency $2f_i$ appears in the correlation output C(t), as indicated in FIG. 9E, and as the result, the effective spurious level is raised. Further the correlation signal and the self convolution signal of N(t) interfere with each other, which gives rise to an effect that the correlation peak is AM modulated by a frequency $2|f_r - f_i|$. These two effects leads to a result that the rate of errors at the restoration of the data is increased remarkably.

That is, the prior art method indicated in FIGS. 7A and 7B has drawbacks that influences of the self convolution signal generated in the SAW convolver are inevitable and that the rate of errors at the restoration of the data increases, exceeding the ideal value. In particular, when a strong narrow frequency band signal is mixed in the input signal, the rate of errors is increased and this point is one of the most serious drawbacks in practice.

OBJECT OF THE INVENTION

The object of the present invention is to provide, in an SS communication apparatus using an SAW convolver, a correlation processing device by the SAW convolver, which can suppress influences of the self convolution signal generated in the SAW convolver, and to reduce errors in the transmission by the SS communication apparatus by means thereof.

SUMMARY OF THE INVENTION

In order to achieve the above object, a correlation processing device by a single track SAW convolver for obtaining a correlation output between an input signal and a reference signal according to the present invention is characterized in that it comprises a first and a second input gate section disposed in the preceding stages of the respective input terminals of the convolver stated above to gate the input signal path and the reference signal path, respectively; an output gate section disposed in the succeeding stage of the output terminal of the convolver stated above to gate the output signal path; and a gate synchronizing section for controlling the gates described above so as to invert the open or closed state of the input gate sections described above for every predetermined period of time and at the same time to turn-on the output gate section described above for a second predetermined period of time around the point of time of the inversion from the turning-on to the turning-off of the input gate sections described above.

A correlation processing device by a two-track SAW convolver according to the present invention is characterized in that it comprises a first and a second input gate section disposed in the preceding stages of the respective input terminals corresponding to a first track of the convolver stated above to gate the input signal path and the reference signal path, respectively; a third and a fourth input gate section disposed in the preceding stages of the respective input terminals corresponding to a second track of the convolver stated above to gate the input signal path and the reference signal path, respectively; a first output gate section disposed in the succeeding stage of the output terminal corresponding to the first track; a second output gate section disposed in the succeeding stage of the output terminal corresponding to the second track; and a gate synchronizing section for controlling the gates described above so as to invert the open or closed state of the first and the second input gate section described above for every predetermined period of time, at the same time to invert the third and the fourth output gate section described above to the state opposite to that of the first and the second gating operation described above for the predetermined period of time, and further to turn-on the first output gate section described above for a second period of time around the point of time of the inversion from the turning-on to the turning-off of the first and the second input gate section described above as well as to turn-on the second output gate section described above for a third period of time around the point of time of the inversion from the turning-on to the turning-off of the third and the fourth input gate section described above.

According to the present invention, in the receiver of a prior art SS communication apparatus using an SAW convolver, the section effecting the correlation processing by means of the SAW convolver is improved so as to suppress influences of the self convolution signal generated in the SAW convolver.

DETAILED DESCRIPTION

Figure 1:
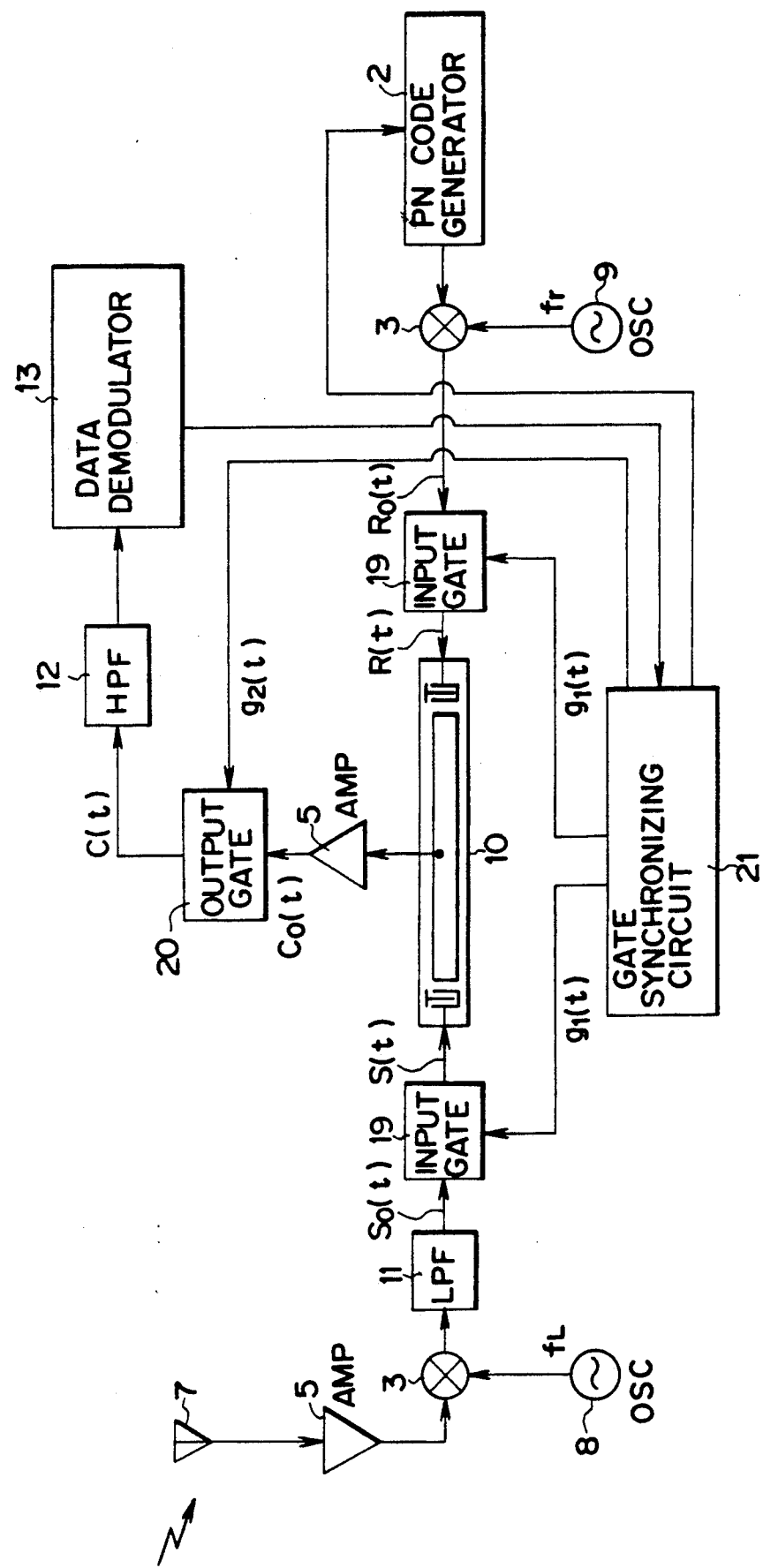
FIG. 1 is a block diagram showing the construction of an SS communication apparatus according to the present invention.
Figure 7A:
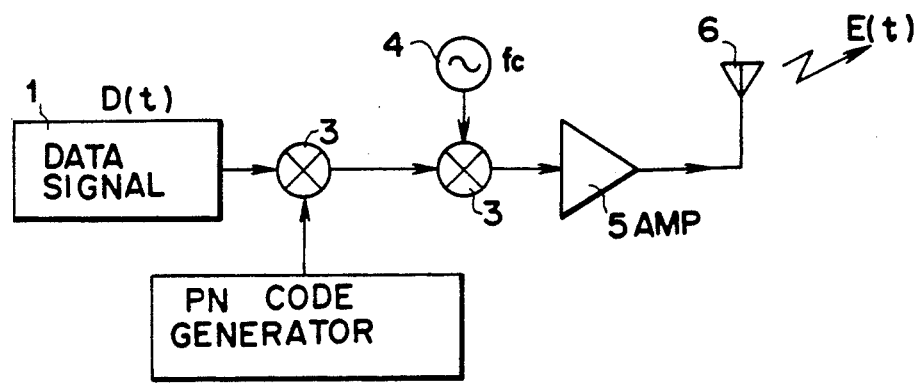
FIGS. 7A and 7B are block diagrams showing the construction of a correlation processing device by a prior art SAW convolver.
Figure 7B:
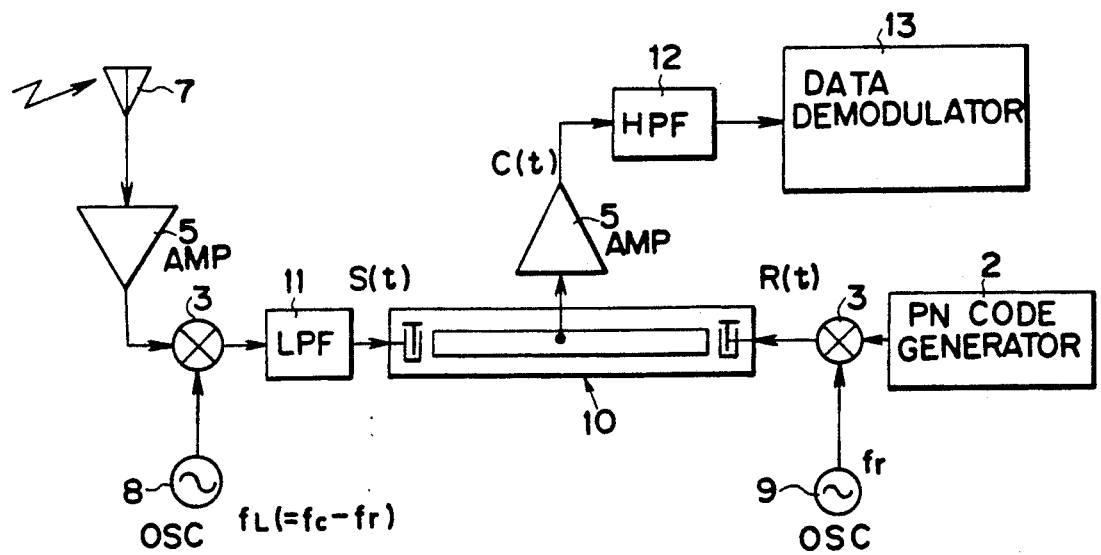
Figure 8:
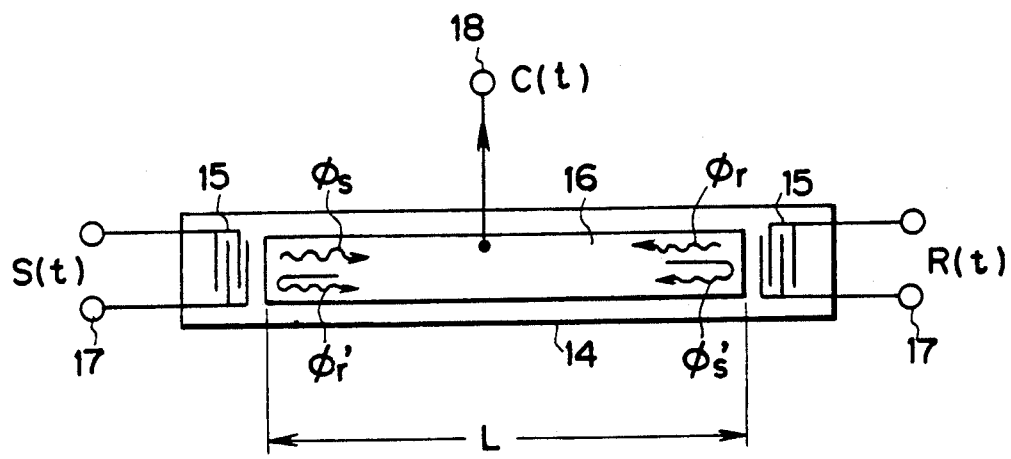
FIG. 8 is a top view of the prior art SAW convolver.
Figure 9A:
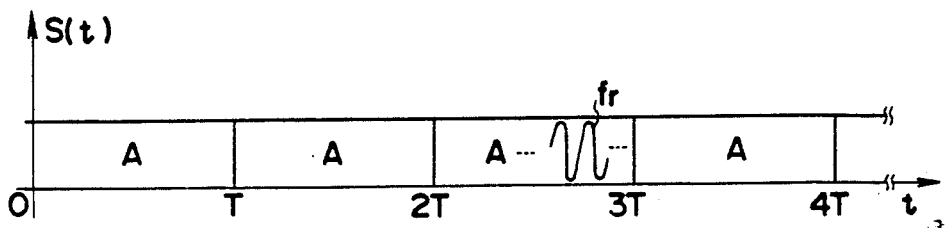
FIGS. 9A to 9E show timing of signals in various parts of the apparatus indicated in FIG. 7.
Figure 9B:
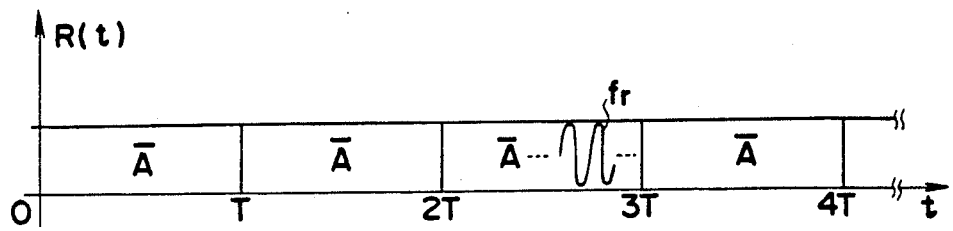
Figure 9C:
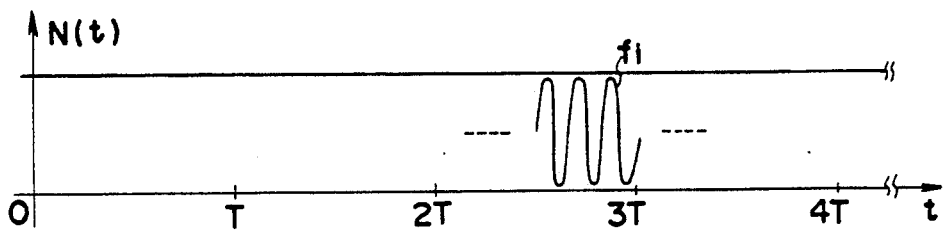
Figure 9D:
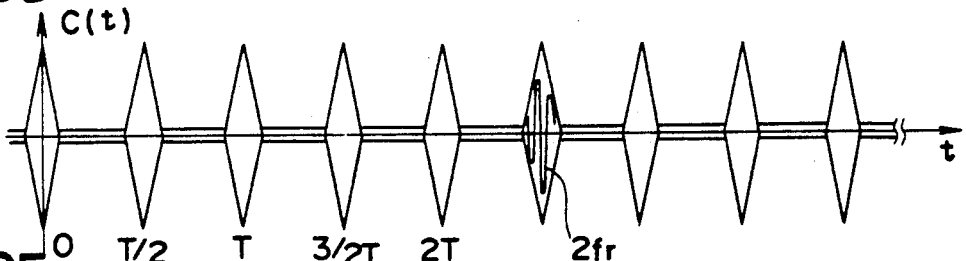
Figure 9E:
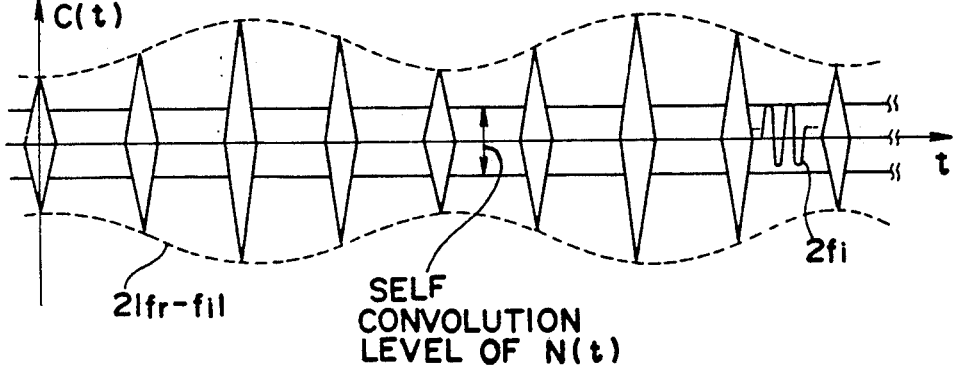

FIG. 1 is a block diagram showing the construction of the receiving section of an SS communication apparatus. In the figure, the reference numerals used in FIGS. 7A and 7B in common represent items identical or similar to those indicated in FIGS. 7A and 7B, and 19 represents an input gate; 20 an output gate; and 21 a gate synchronizing section.

The present invention differs from the prior art system in the following points.

(a) An input gate 19 is disposed in the preceding stage of each of the input terminals of the SAW convolver.

(b) The output of the SAW convolver is taken out through the output gate 20.

(c) A gate synchronizing section 21 is disposed for controlling and synchronizing the timing of the production of the PN code of the reference signal $R_o(t)$, the timing of the turning-on and off of the input gates 19 and the timing of the turning-on and off of the output gate.

The gate synchronizing section 21 controls the input signal $S_o(t)$ and the reference signal $R_o(t)$ as well as the turning-on and off of the input gates and the turning-on and off of the output gate so as to be effected with the timings as indicated in FIGS. 2A to 2D, in which the in-gate delay time T is so set that it is equal to the period of the PN code $T_{PN}$ or it is integer times as great as $T_{PN}$. This is hereinbelow a tacit assumption.

Figure 2A:
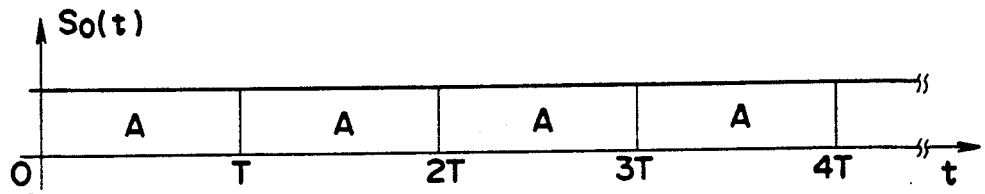
FIGS. 2A to 2D show timing of signals in various parts of the apparatus indicated in FIG. 1.
Figure 2B:
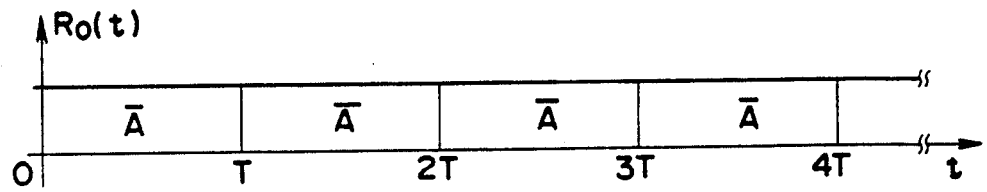
Figure 2C:
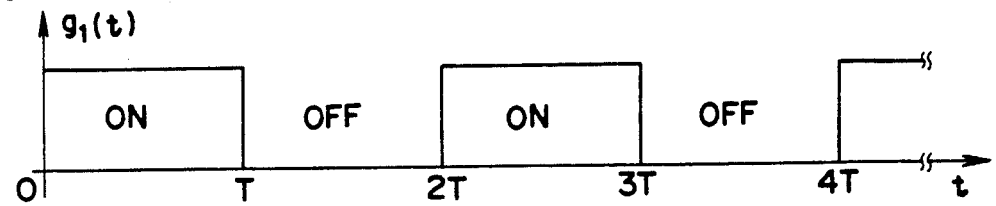
Figure 2D:
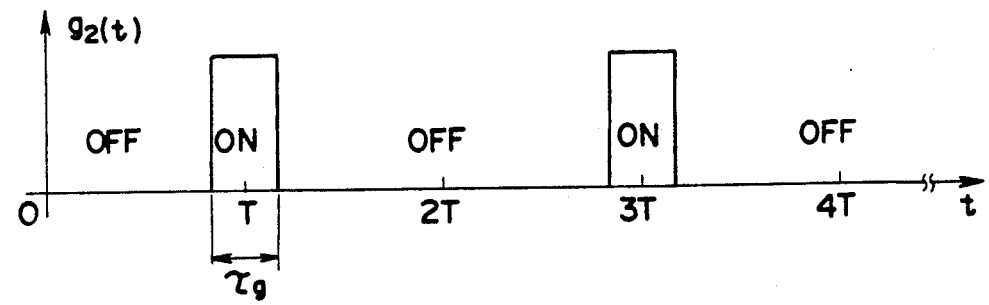

FIG. 2A represents the input signal; FIG. 2B the output signal; FIG. 2C the input gate control signal; and FIG. 2D the output control signal.

In FIGS. 2A to 2D, T denotes the in-gate delay time and it is expressed by Eq. (2) stated previously. Further, in the schemes indicating the timings of the input gate and the output gate, ON represents the state where the gate is open (the signal passes therethrough), while OFF represents the state where the gate is closed (the signal is cut off). FIGS. 2A to 2D indicate the following timing.

(a) The beginning of the PN code of the input signal, the beginning of the PN code of the reference signal and the timing of the change of the open or closed state of the input gates are synchronized.

(b) The input gates repeat the turning-on and off with a period of 2T. They are in the open state during a half of time (T) and in the closed state in the remaining half of time in one period.

(c) The output gate repeats also the turning-on and off with a period of 2T. The open state of the output gate is so set that it is in the open state only during a time width $\tau_g$ around the timing where the state of the input gate is changed from the open state to the closed state. Although the value of $\tau_g$ is not specifically determined, it is desirable to choose a value as small as possible in a region greater than the time width of the main correlation peak of the correlation output signal.

Figure 3:
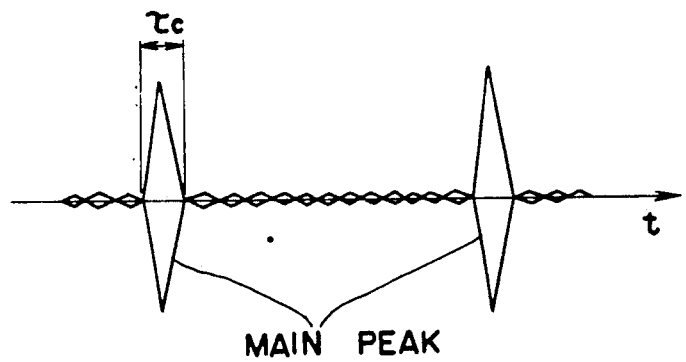
FIG. 3 shows the waveform of the correlation output.

The time width of the main correlation peak of the correlation output signal is represented by $\tau_c$ in FIG. 3 and $\tau_c$ is equal to the period of the clock signal for the PN code generator. Consequently, in other words, it can be said that it is desirable to choose $\tau_g$ so as to be as small as possible in a region $\tau_g \gtrsim \tau_c$ with respect to the period $\tau_c$ of the clock signal for the PN code generator.

Both the input gates 19 and the output gate 20 are gates controlling the passage of RF signals and can be realized e.g. by using mixers or analogue switches.

Hereinbelow the operation of the embodiment described above will be explained.

Next the reason why the correlation processing according to the present invention is effected by using the construction as indicated in FIG. 1 and the timing control as indicated in FIGS. 2A to 2D will be explained.

FIG. 4 indicates that it is possible to suppress the influences of the self convolution signal by the method according to the present invention. FIGS. 4A to 4G indicate how signals S(t), R(t), $C_o(t)$ and C(t) in different parts in the device indicated in FIG. 1 vary, when narrow frequency band signals N(t) are mixed in the input signal, in which FIG. 4A shows the state of the input gates; FIG. 4B the input signal, when there are no narrow frequency band signals; FIG. 4C the reference signal; FIG. 4D a narrow frequency band disturbing signal; FIG. 4E the correlation output before the passage through the output gate; FIG. 4F the state of the output gate; and FIG. 4G the correlation output after the passage through the output gate.

Figure 4A:
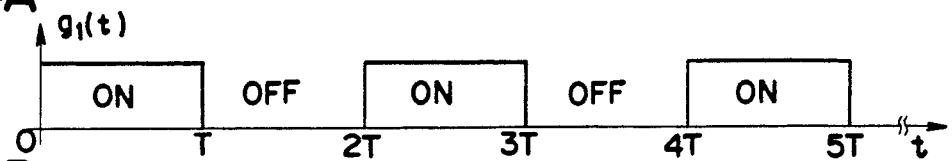
FIGS. 4A to 4G show timing of signals in various parts of the apparatus indicated in FIG. 1, when a narrow frequency band signal N(t) is mixed in the input signal.
Figure 4B:
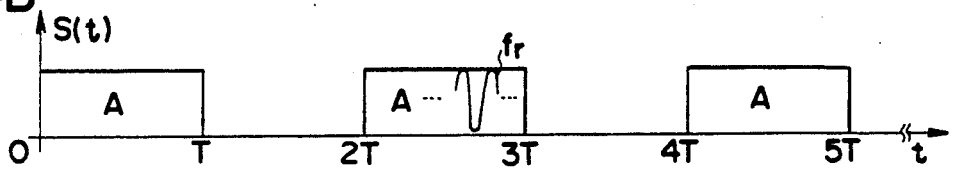
Figure 4C:
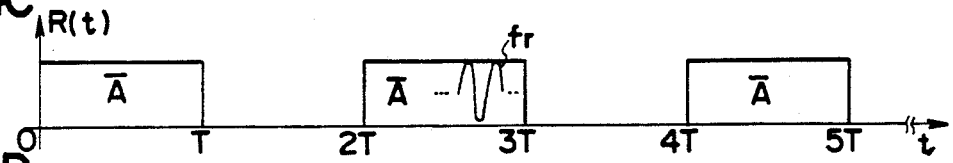
Figure 4D:
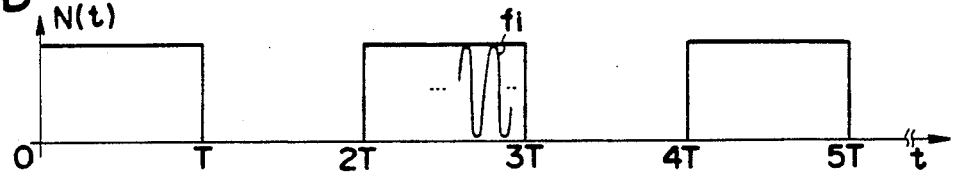
Figure 4E:
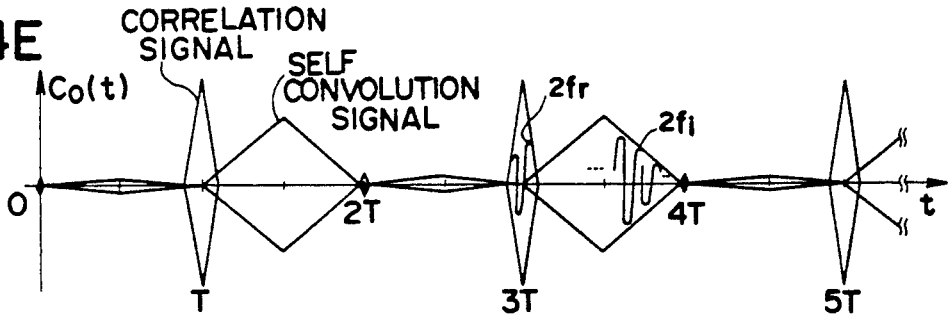
Figure 4F:
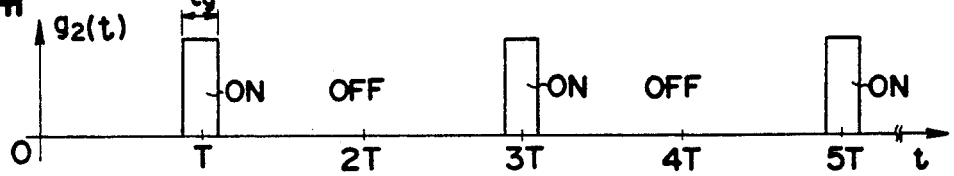
Figure 4G:
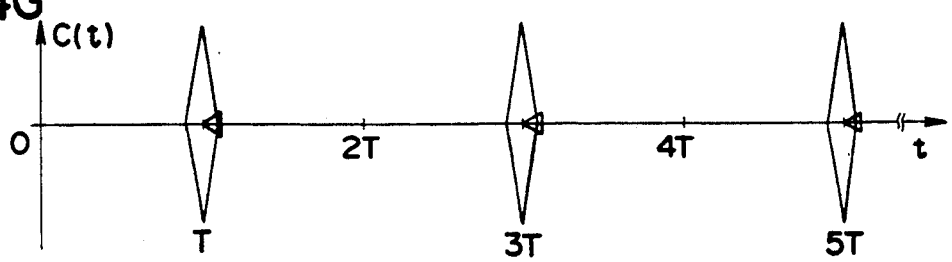

Examining the correlation output $C_o(t)$ before the passage through the output gate indicated in FIG. 4E, it can be understood that the self convolution signal due to the narrow frequency band signal N(t) rises gradually after the point of time, where the correlation signal is greatest. Further it can be understood also that the self convolution signal is greatest after the lapse of a time of T/2 starting therefrom and thereafter decreases gradually so as to be again extremely small after the lapse of a time of T and almost not to give any influences on the peak of the succeeding correlation signal. That is, it can be understood that, on the correlation output $C_o(t)$ before the passage through the output gate, the main peak of the correlation signal and the self convolution signal are almost separated in time. This is an important difference from the fact that, by the prior art method indicated in FIGS. 9A to 9E, the correlation signal and the self convolution signal exist mixedly and interfere with each other. Such a separation in time of the correlation signal and the self convolution signal has been realized according to the present invention by disposing the input gates 19 and further by effecting the timing control as indicated in FIGS. 2A to 2D. It can be easily verified by using Eq. (1) that the correlation output as $C_o(t)$ is obtained by using burst signals as $S(t)$, $R(t)$ and $N(t)$ indicated in FIGS. 4B, 4C and 4D, respectively. It is for the purpose of taking out only the main peak of the correlation signal from the correlation output $C_o(t)$ before the passage through the output gate that the output gate 20 as indicated in FIG. 1 is disposed and further the timing control as indicated in FIGS. 2A to 2D is effected according to the present invention.

This aspect will be clear, referring to FIGS. 4A to 4G. The reason why it is desirable to choose the gate width $\tau_g$ for the output gate so as to be as small as possible in the region over the time width $\tau_c$ of the main correlation peak is to taking out the correlation main peak and further to reduce the influences of the self convolution signal. This point is also clear, referring to FIGS. 4A to 4G. The final correlation output $C(t)$ is obtained in this way. Comparing $C(t)$ indicated in FIG. 4G with $C(t)$ indicated in FIGS. 9D and 9E, it can be understood that the influences of the self convolution signal are extremely small in the result obtained according to the present invention with respect to those obtained by the prior art method. Consequently, by the correlation processing method according to the present invention it is possible to suppress the self convolution signal produced in the SAW convolver and as the result it is possible to reduce errors in the transmission by means of the SS communication apparatus. This is the working principle of the present invention.

Further, in the case where the correlation processing method according to the present invention is applied to the SS communication apparatus using the SAW convolver, basically the construction of the transmitter of the SS communication apparatus may be identical to the construction by the prior art method. However, in the case a usual one-track SAW convolver is used, the signal structure should contain at least two periods of the PN code in one bit of the data signal (by the prior art method the signal structure should contain at least one period of the PN code in one bit of the data signal). This is because, for the present invention, in the case where a one-track convolver is used, as indicated in FIGS. 4A to 4G, the period of the correlation output appearing in the receiver is equal to twice (2T) as long as the period (T) of the PN code. Consequently, in the case where a PN code having a same period is used and in addition an SAW convolver having same characteristics is used, with a one-track convolver the highest data transmission speed according to the present invention is ½ of that obtained by the prior art method.

Figure 5:
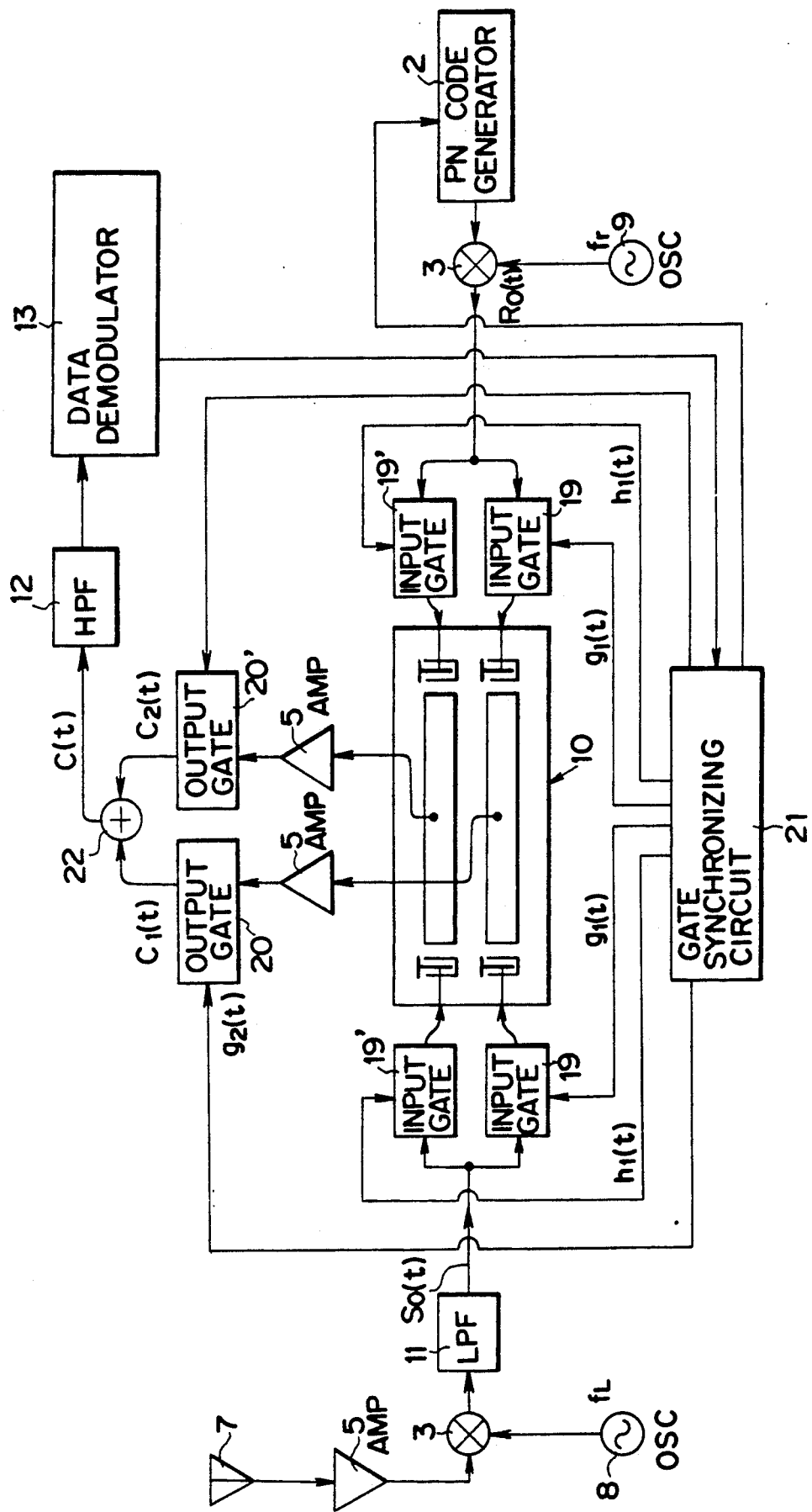
FIG. 5 is a block diagram showing the construction of a correlation processing device by a two-track SAW convolver.

However, according to the present invention it is possible also to realize the highest data transmission speed obtained by the prior art method. This method is indicated in FIGS. 5 and 6A to 6I. FIG. 5 is a block diagram indicating the construction of the receiving section, in which the reference numerals used in FIG. 1 common represent the items identical or corresponding to those indicated in FIG. 1; 19' is another input gate; 20' is another output gate; and 22 is an adding circuit.

Figure 6A:
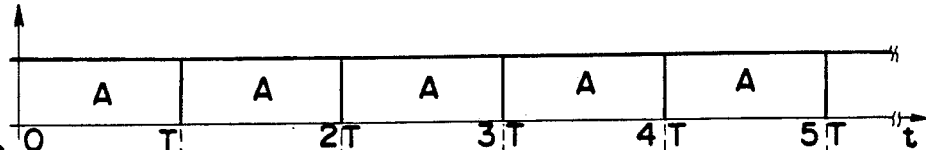
FIGS. 6A to 6I show timing of signals in various parts of the apparatus indicated in FIG. 5.
Figure 6B:
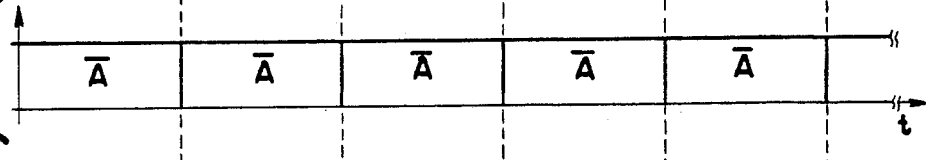
Figure 6C:
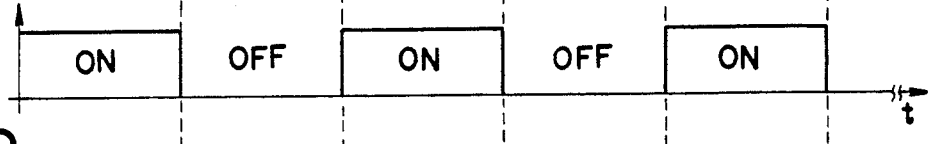
Figure 6D:
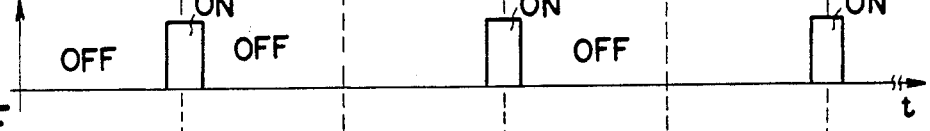
Figure 6E:
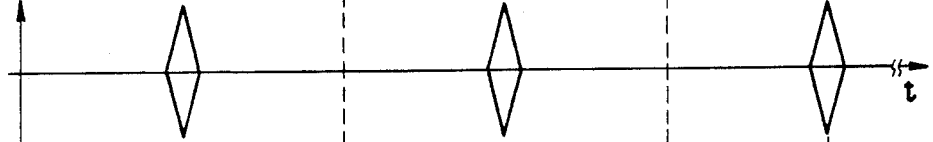
Figure 6F:
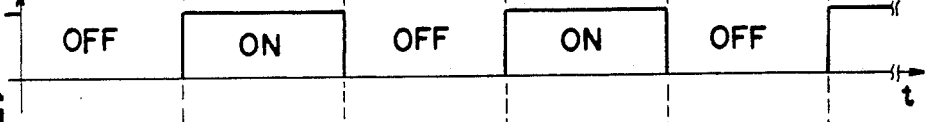
Figure 6G:
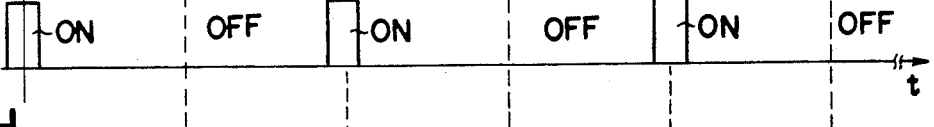
Figure 6H:
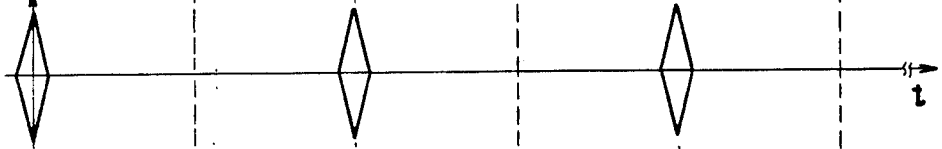
Figure 6I:
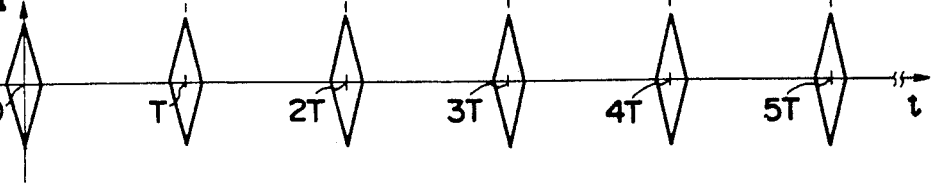

FIGS. 6A to 6I shows the timing of the turning-on and off of the different gates and the waveform of the signal in different parts indicated in FIG. 5, in which FIG. 6A represents $S_o(t)$; FIG. 6B $R_o(t)$; FIG. 6C $g_1(t)$; FIG. 6D $g_2(t)$; FIG. 6E $C_1(t)$; FIG. 6F $h_1(t)$; FIG. 6G $h_2(t)$; FIG. 6H $C_2(t)$; and FIG. 6I $C(t)$.

The device indicated in FIG. 5 is so constructed that a two-track convolver is used (or two convolvers may be used instead thereof) and the timing of the turning-on and off of the input and the output gates are so arranged that $g_1(t)$ and $g_2(t)$ as well as $h_1(t)$ and $h_2(t)$ are shifted by T from each other. In this way, as indicated in FIGS. 6A to 6I, a correlation output appears for every period (T) of the PN code. When the data are restored, starting from the correlation output, the data can be restored up to the data, whose time width corresponding to one bit is greater than the time width T. Therefore, in the case where the receiver has the construction indicated in FIG. 5, the signal structure of the transmitted signal can be such that at least one period of the PN code is contained in one bit of the data signal. Consequently it is possible to realize the highest transmission speed equivalent to that obtained by the prior art method.

In the above the constructions according to FIGS. 1 and 5 according to the present invention have been described, laying emphasis on clear indication of the correlation processing method using an SAW convolver. In a real receiver, apart from the constituent elements indicated in each of the figures, an AGC, an initial synchronization section and a code synchronizing section are necessary. Further a PDI section, an error correcting section, etc. may be included. However, since these constituent elements are not necessary for indicating the fundamental operation of the present invention, they are omitted in FIGS. 1 and 5. Further the kind of the SAW convolver used for realizing the present invention is not particularly restricted. A monolithic MIS type SAW convolver of ZnO/Si structure, etc. or a separated medium type SAW convolver may be used instead thereof. Still further it is possible also to use an elastic type SAW convolver, in which the substrate is made of $LiNbO_3$, etc.

The present invention can be applied not only to an SS communication apparatus using an SAW convolver but also to other apparatuses using SAW convolvers. Concretely speaking, it can be applied to a correlator, a lader, image processing, a Fourier transformer, etc.

As explained above, according to the present invention, in an SS communication apparatus using an SAW convolver, it is possible to suppress the influences of the self convolution signal produced in the SAW convolver. Therefore it is possible to reduce the spurious level of the correlation signal or to alleviate influences of narrow frequency band disturbing signals. As the result an effect can be obtained that errors in the transmission by means of the SS communication apparatus are reduced.

The embodiments of the invention in which an exclusive property or privilege is claimed are defined as follows:

1. A correlation processing device comprising:
    a single track surface acoustic wave convolver having first and second input terminals and having an output terminal, said convolver producing at said output terminal a correlation between signals applied to said input terminals;

selectively actuable first and second input gate sections which each have an input and an output, an input signal and a reference signal being respectively applied to said inputs of said first and second gate sections, and said outputs of said first and second gate sections each being coupled to a respective one of said input terminals of said convolver, each said input gate section respectively effecting and preventing electrical coupling of said input thereof to said output thereof when respectively actuated and deactuated;

a selectively actuable output gate section which has an input coupled to said output terminal of said convolver and has an output, said output gate section respectively effecting and preventing electrical coupling of said input thereof to said output thereof when respectively actuated and deactuated; and gate synchronizing means for controlling actuation and deactuation of said gate sections, said gate synchronizing means periodically actuating each of said input gate sections for a first predetermined period of time and periodically actuating said output gate section for a second predetermined period of time which respectively begins and ends while said input gate sections are respectively actuated and deactuated.

2. A correlation processing device comprising:

a two-track surface acoustic wave convolver having first, second, third and fourth input terminals and having first and second output terminals, said convolver producing at said first output terminal a correlation between signals applied to said first and second input terminals and producing at said second output terminal a correlation of signals applied to said third and fourth input terminals;

selectively actuable first and second input gate sections which each have an input and an output, an input signal and a reference signal being respectively applied to said inputs of said first and second input gate sections, and said outputs of said first and second input gate sections being respectively coupled to said first and second input terminals of said convolver, each of said first and second input gate sections respectively effecting and preventing electrical coupling of said input thereof to said output thereof when respectively actuated and deactuated;

selectively actuable third and fourth input gate sections which each have an input and an output, said input signal and said reference signal being respectively applied to said inputs of said third and fourth gate sections, and said outputs of said third and fourth gate sections being respectively coupled to said third and fourth input terminals of said convolver, each of said third and fourth gate sections respectively effecting and preventing electrical coupling of said input thereof to said output thereof when respectively actuated and deactuated;

a selectively actuable first output gate section which has an input coupled to said first output terminal of said convolver and has an output, said first output gate section respectively effecting and preventing electrical coupling of said input thereof to said output thereof when respectively actuated and deactuated;

a selectively actuable second output gate section which has an input coupled to said second output terminal of said convolver and has an output, said second output gate section respectively effecting and preventing electrical coupling of said input thereof to said output thereof when respectively actuated and deactuated; and gate synchronizing means for controlling actuation and deactuation of said gate sections, said gate synchronizing means periodically actuating each of said first and second input gate sections for a first predetermined period of time, and respectively actuating and deactuating said third and fourth input gate sections when said first and said second input gate sections are respectively deactuated and actuated, said gate synchronizing means periodically actuating said first output gate section for a second predetermined period of time which respectively begins and ends while said first and second input gate sections are respectively actuated and deactuated, and periodically actuating said second output gate section for a third predetermined period of time which respectively begins and ends while said third and fourth input gate sections are respectively actuated and deactuated.

3. A correlation processing device according to claim 1, including reference signal generating means for generating said reference signal, said reference signal generating means including a PN code generator and being controlled by said gate synchronizing means in a manner facilitating synchronization of said PN code generator with said periodic actuation of said input and output gate sections.

4. A correlation processing device according to claim 1, wherein a delay time in each of said gate sections is equal to a period of a PN code generated by said PN code generator or is an integer multiple of said period of said PN code.

5. A correlation processing device according to claim 1, wherein one bit of a data signal in said input signal has a duration which is at least as long as two periods of a PN code in said input signal.

6. A correlation processing device according to claim 2, including summing means for forming the sum of the signals at said outputs of said first and said second output gate sections and means for restoring a data signal present in said input signal from an output signal of said summing means.

7. A correlation processing device according to claim 2, including reference signal generating means for generating said reference signal, said reference signal generating means including a PN code generator and being controlled by said gate synchronizing means in a manner facilitating synchronization of said PN code generator with said periodic actuation of said input and output gate sections.

8. A correlation processing device according to claim 2, wherein a delay time in each of said gate sections is equal to a period of a PN code generated by said PN code generator or is an integer multiple of said period of said PN code.

9. A correlation processing device according to claim 1, wherein said second predetermined period of time is substantially less than said first predetermined period of time.

10. A correlation processing device according to claim 9, wherein said gate synchronizing means deactuates said input gate sections at a point in time approximately halfway through said second predetermined period of time.

11. A correlation processing device according to claim 9, wherein said correlation produced by said convolver at said output thereof includes a main correlation peak, and wherein said second predetermined period of time is approximately equal to said duration of said main correlation peak.

12. A correlation processing device according to claim 2, wherein said second predetermined period of time is substantially less than said first predetermined period of time.

13. A correlation processing device according to claim 12, wherein said gate synchronizing means deactuates said first and second input gate sections at a point in time approximately halfway through said second predetermined period of time, and deactuates said third and fourth input gate sections at a point in time approximately halfway through said third predetermined period of time.

14. A correlation processing device according to claim 12, wherein said correlation produced at said first output of said convolver includes a first main correlation peak and said correlation produced at said second output of said convolver includes a second main correlation peak, and wherein said second predetermined period of time is approximately equal to a duration of said first main correlation peak and said third predetermined period of time is approximately equal to a duration of said second main correlation peak.

* * * * *